UNITED STATES PATENT OFFICE.

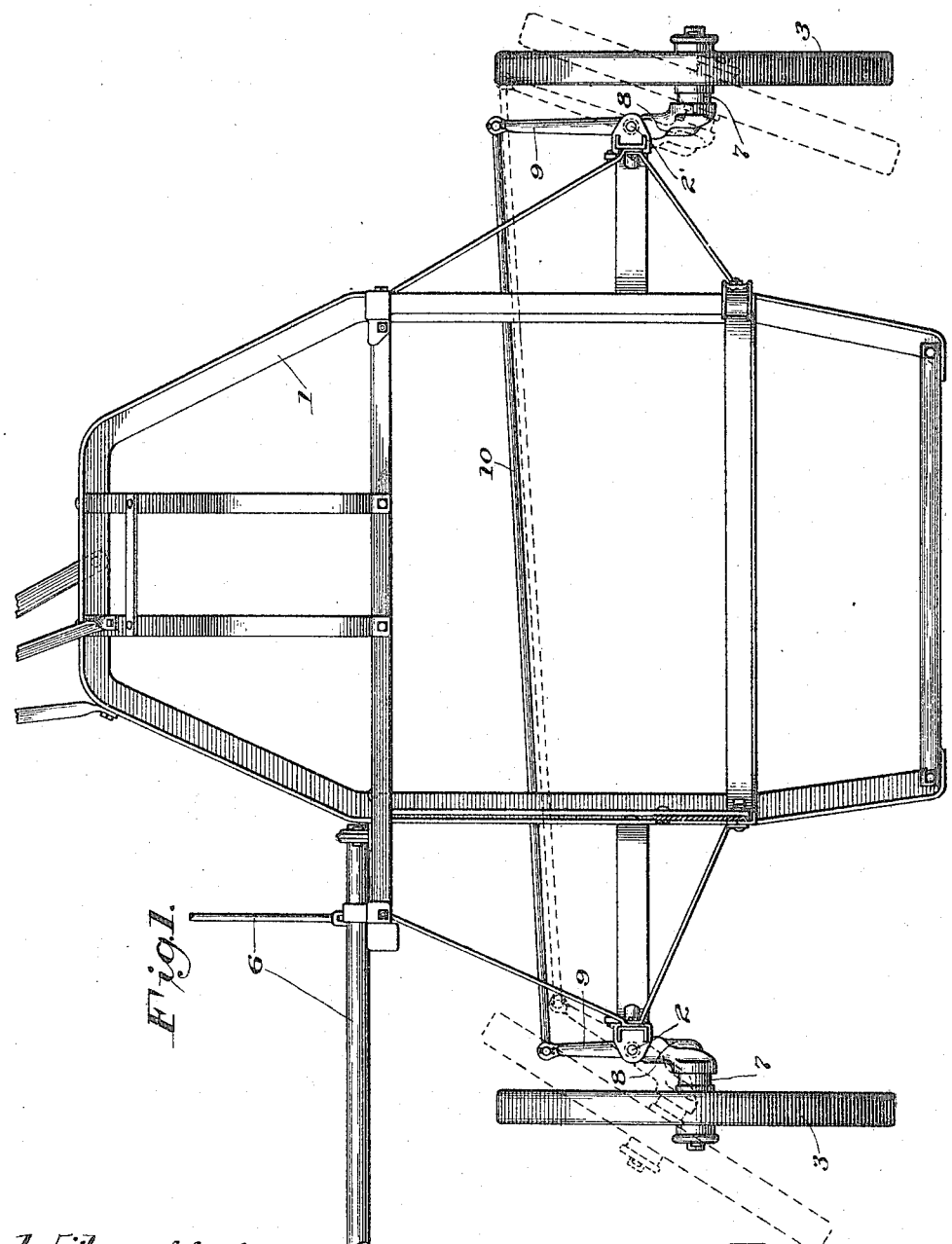

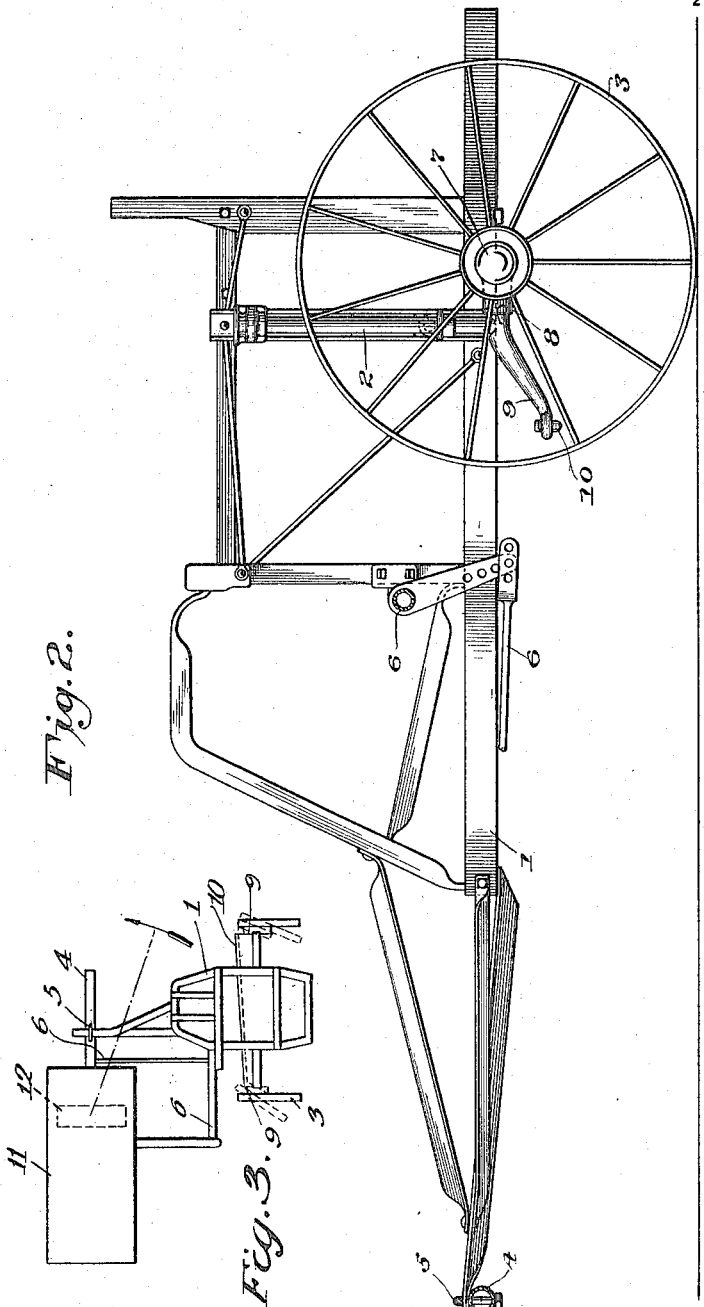

CLEMMA R. RANEY, OF CHICAGO, AND ROBERT C. LIVESAY, OF MOLINE, ILLINOIS, ASSIGNORS TO INTERNATIONAL HARVESTER COMPANY OF NEW JERSEY, A CORPORATION OF NEW JERSEY.

TRUCK FOR WHEELED VEHICLES.

1,216,360.        Specification of Letters Patent.       Patented Feb. 20, 1917.

Application filed January 6, 1913. Serial No. 740,482.

*To all whom it may concern:*

Be it known that we, CLEMMA R. RANEY and ROBERT C. LIVESAY, citizens of the United States, residing at Chicago and Moline, respectively, in the county of Cook and the county of Rock Island, respectively, and State of Illinois, have invented certain new and useful Improvements in Trucks for Wheeled Vehicles, of which the following is a full, clear, and exact specification.

Our invention relates to trucks for wheeled vehicles.

It has for its object to maintain the wheels of a truck in such relation with respect to each other during angular movement of the vehicle that the latter may be readily turned in a small space without sidewise dragging of the wheels. We attain this object by providing improved means independent of the truck which, when the latter is turned, automatically turn the wheels in such angular relation with respect to each other that the same move through arcs of eccentric circles of different diameters.

In the accompanying drawings we have illustrated one embodiment of our invention adapted to use in connection with a grain shocker. It is to be understood, however, that the embodiment shown herein is susceptible of modification and adapted to use in other connections.

Figure 1 is a top plan view of the shocker frame and the transport wheels.

Fig. 2 is a side elevation of the same, the frame being shown to be supported on a member protruding from the harvester.

Fig. 3 is a diagrammatic view of our invention applied to a grain shocker, the latter being attached to a harvester.

In the construction shown a shocker frame 1 is carried between a pair of rotatable vertical standards 2 mounted on a single pair of transport wheels 3. The forward end of this frame 1 is supported upon a rod or bar 4 projecting from the side of the harvester and is so positioned with respect thereto by a band 5 and draft links 6 that it is freely movable longitudinally within certain limits, but at the same time is drawn along and moved angularly with the harvester. Inasmuch as the construction of the shocker frame and the harvester *per se* forms no part of this invention, a specific description of the same is omitted.

In our improvement we mount the transport wheels 3 upon stub axles 7 projecting outwardly at right angles from the rear ends of substantially horizontally disposed normally parallel axle shanks 8. As shown in Fig. 2, the shanks 8 are preferably formed integral with the standards 2 and extend substantially at right angles therefrom toward the rear of the machine. In front of the standards 2 each of the shanks 8 is provided with an elongated front shank 9 which is preferably formed integral therewith and bent slightly downward, as shown in Fig. 2, so that it will not engage with the lower horizontal portion of the frame 1. The free ends of these front shanks are pivotally connected to each other through a connecting link, or reach rod, 10. In the drawings we have illustrated the transport gear to be of a construction adapted to use in connection with a "left-hand harvester 11"; that is, a harvester which cuts at the left and always moves around the grain in a counter-clockwise direction, turning toward the left about its main wheel 12. In this construction the front shank 9 of the left-hand shank 8 is made shorter than the shank 9 on the right-hand shank 8 to such a degree that when the frame 1 is moved angularly to the left about a pivot on the harvester drive wheel, the right-hand wheel 3 is turned through a smaller angle by the pivoted connection 10 than the left-hand wheel, so that it moves through a larger circle than the latter. Obviously, when it is desired to place our improved construction upon a right-hand harvester, it is only necessary to reverse the relative relation of the parts. It is obvious that if desired the member 10 may be connected between the rear shanks, the latter, in such a construction, being made of unequal length in the manner in which the front shanks are shown in this application.

The operation of the construction shown is as follows: When the harvester 11 makes a left-hand turn, (Fig. 3) as at the end of the field, the shocker frame is swung about in a forward direction and to the left, the main wheel 12 of the harvester forming the axis. As the frame 1 is thus moved angularly, the wheels 3 of the shocker are automatically turned to the right toward the dotted line position shown. Due to the pivotal connection between the wheels 3 and the difference in the lengths of the front shanks 9, the right-hand wheel is automatically turned through a smaller angle than the left-hand wheel, so that, during the continued angular movement of the frame, it moves through the arc of a circle larger than that described by the left-hand wheel and eccentric with respect thereto. Obviously, as soon as the turn is completed and the harvester straightens out for the cutting operation upon the next stretch, the frame 1 is automatically swung forward and the wheels 3 are returned to their normal parallel relation with respect to each other. Should the turn made by the harvester be to the right instead of to the left, obviously the angular movement of the wheels would be reversed.

It is to be noted that the wheels 3 are kept in the desired angular relation with respect to each other throughout the entire angular movement of the frame, and that the off wheel is always freely rotatable about its axle so that sidewise sliding of the wheels and the consequent burying of the same in the ground is thus avoided. This results not only in reducing the wear and tear upon the truck and the machine carried thereby, but at the same time cuts down the necessary amount of power requisite to move the truck. It is further to be noted that the parts are so pivoted that a small movement of the left-hand wheel 3 is imparted directly to the right-hand wheel, and that, due to the lever arrangement employed, a minimum of effort is required to move the latter about its pivot.

While we have described one embodiment of our invention in this application, and shown the same adapted to use in one connection, it is to be understood that the construction shown herein may be modified without departing from the spirit of our invention and may be used in other constructions.

What we claim as new, and desire to secure by Letters Patent, is:

1. In combination, a frame, a plurality of wheels therefor, means for deflecting said frame from a rectilinear movement, and means independent of said frame and of said deflecting means moving said wheels angularly with respect to each other upon deviation of said frame from a rectilinear movement.

2. In combination, a frame, a plurality of wheels therefor, means movable about a pivot for deflecting said frame from a rectilinear movement, and means independent of said frame deflecting means for deflecting said wheels upon the deflection of said frame and deflecting the wheel adjacent the turn through a greater angle than its fellow.

3. In combination, a frame, a plurality of wheels therefor, means for drawing said frame and deflecting it from a rectilinear movement, and means independent of said frame and of said frame deflecting means for deflecting said wheels and deflecting the wheel adjacent the turn through a greater angle than its fellow.

4. In combination, a sulky frame, a plurality of wheels therefor, means for deflecting said frame from a rectilinear movement, and means independent of the frame and of said frame deflecting means for deflecting said wheels and deflecting the wheel adjacent the turn through a greater angle than its fellow.

5. In combination, a frame, means for deflecting said frame from a rectilinear movement, a plurality of axles angularly movable with respect thereto about vertical axes, said axles being provided with shanks of different lengths, and means pivoted directly to the ends of said shanks connecting said ends.

6. In combination, a frame, means for deflecting said frame from a rectilinear movement, a plurality of axles angularly movable with respect thereto about vertical axes, wheels on said axles and rigid means independent of said frame coöperating with said axles to turn the same through different angles upon an angular movement of the frame.

7. In combination, a frame, means for deflecting said frame from a rectilinear movement, a plurality of axles angularly movable with respect thereto about vertical axes, wheels on said axles and a connecting link pivotally connected to said axles independent of said frame, coöperating with said axles upon deviation of said frame from a rectilinear movement to deflect said axles angularly with respect to each other.

8. In a vehicle truck, a frame, a plurality of axles pivotally connected thereto at different points intermediate their ends and movable on vertical axes, each of said axles having a wheel carrying stub protruding at right angles from one of its ends, and rigid connecting means pivoted directly to the opposite ends of said axles.

9. In a vehicle truck, a frame, a plurality of horizontally disposed axles pivoted thereto and movable on vertical axes, said axles being provided with shanks of different lengths on one side of their axes and with wheel carrying stubs projecting at right angles from their opposite ends, and rigid means connecting the ends of said shanks.

10. In a vehicle truck, a plurality of horizontally disposed axles pivoted thereto intermediate their ends and movable with respect thereto about vertical axes, said axles having shanks of different lengths upon one end thereof, wheels rotatably mounted upon the opposite ends thereof, and a rigid link pivotally connecting the ends of said shanks.

11. In combination, a leading unit movable bodily with respect to the rectilinear about a pivot, a trailing unit operatively connected thereto, a plurality of supporting wheels pivotally connected to said trailing unit, and means independent of said leading unit for automatically moving said wheels through arcs of eccentric circles as said leading unit is turned about its pivot.

12. In combination, a harvester, a main wheel thereon, a frame operatively connected to said harvester and trailing in rear thereof, a plurality of supporting wheels pivotally mounted on said frame, and means whereby as said harvester turns about its main wheel as a pivot said wheels are moved through arcs of eccentric circles.

13. In combination, a harvester, a main wheel thereon, a frame operatively connected to said harvester and trailing at the rear thereof, a plurality of supporting wheels pivotally connected to said frame, and operative connections between said wheels and independent of said frame whereby upon a movement of said harvester about its main wheel as a pivot said wheels are deflected angularly with respect to each other.

14. In combination, a harvester, a main wheel thereon, a frame operatively connected to said harvester and trailing in rear thereof, a plurality of supporting wheels pivotally mounted on said frame, shanks of different lengths operatively connected to said wheels, and means connecting said shanks whereby as the harvester is moved about a pivot on its main wheel said wheels are moved through arcs of eccentric circles of different diameter.

15. In a vehicle truck, a frame, a plurality of horizontally disposed axles having standards rotatable with respect to said frame and oppositely disposed members projecting substantially at right angles from opposite sides of the lower ends of said standards, the members on one side of said standards being of different lengths, a rigid link pivotally connecting said last mentioned members, stub axles carried upon the other members and disposed at right angles thereto, and wheels rotatably mounted upon said stub axles.

In testimony whereof we affix our signatures, in the presence of two witnesses.

CLEMMA R. RANEY.
ROBERT C. LIVESAY.

Witnesses for Raney:
  RAY PATTISON,
  FRANK O. ZABILKA.
Witnesses for Livesay:
  E. H. HEMMINGSON,
  T. E. VAN METER.

Copies of this patent may be obtained for five cents each, by addressing the "Commissioner of Patents, Washington, D. C."